United States Patent [19]

Horne et al.

[11] Patent Number: 4,859,866
[45] Date of Patent: Aug. 22, 1989

[54] WATER TURBINE ARRANGEMENT FOR POWER GENERATION USING TIDAL ENERGY

[76] Inventors: Colin Horne; Edward B. Morgan, both of 26 Horseshoe Park, Pangbourne, Reading, Berks, Great Britain, RG8 7JW

[21] Appl. No.: 226,672

[22] Filed: Aug. 1, 1988

[30] Foreign Application Priority Data

Aug. 5, 1987 [GB] United Kingdom ............... 8718551
Jun. 9, 1988 [GB] United Kingdom ............... 8813705

[51] Int. Cl.⁴ .................................... F03B 13/00
[52] U.S. Cl. ................................... 290/54; 290/53
[58] Field of Search .................... 290/53, 42, 54, 43

[56] References Cited

U.S. PATENT DOCUMENTS

| | | | |
|---|---|---|---|
| 2,820,148 | 1/1958 | Southwick | 290/42 |
| 3,426,540 | 2/1969 | Fixel | 290/42 |
| 3,993,913 | 11/1976 | Dickman | 290/53 |
| 4,039,847 | 8/1977 | Diggs | 290/53 X |
| 4,108,579 | 3/1978 | Martinez et al. | 290/42 X |
| 4,317,330 | 3/1982 | Brankovics | 290/54 X |
| 4,717,831 | 1/1988 | Kikuchi | 290/54 X |

*Primary Examiner*—William M. Shoop, Jr.
*Assistant Examiner*—Sharon D. Logan
*Attorney, Agent, or Firm*—Davis, Bujold & Streck

[57] ABSTRACT

The arrangement enables power generation on both ebb and flow tides, and is characterized in that one or more turbines (8) is used of a type designed for unidirectional flow, in that the or each turbine is mounted in a wall (7) which divides an enclosed space into a first area (4a) which can be brought into communication with the tidal water source (3) and a second area which can be brought into communication with a basin (2) separated from said source, and in that adjustable sluices (9a, 9b, 10a, 10b) are associated with each area and arranged so that, irrespective of the tide direction, the sluices can be adjusted to cause water to flow only in said uni-direction through the turbine.

The enclosed space may be provided by a walled enclosure which includes a part (1a) of the length of a barrage wall (1) extending across the water source.

Preferably the walled enclosure is rectangular comprising two side walls (5) and a rear wall (6) and the wall (7) in which the turbine (8) is mounted extends from said part length (1a) of the barrage wall to said rear wall.

In a development of the invention, the turbine wall (7) is extended to divide the basin into two subbasins (2a, 2b) to enable prolonged power generation to occur and economy in turbine numbers to be made by double use of them.

5 Claims, 2 Drawing Sheets

WATER TURBINE ARRANGEMENT FOR POWER GENERATION USING TIDAL ENERGY

This invention relates to a water turbine arrangement for power generation, and in particular the manner in which the turbine is located in the path of a tidal water source.

It has already been proposed to utilise the tidal flow in deep river estuaries, such as the River Severn, to produce hydro-electric power. However, in spite of the immediate attractions of such proposals, certain disadvantages have arisen which are proving very expensive to overcome.

Our co-pending application UK patent application No. 8718551 describes some of these disadvantages, and proposed solutions thereto.

The present application is partly divided-out of our said co-pending patent application.

According to this invention, an arrangement for locating a water turbine in the path of a tidal water source for both ebb and flow power generation, comprises a turbine designed for uni-directional flow mounted in a wall which divides an enclosed space into a first area which can be brought into communication with the tidal water source and a second area which can be brought into communication with a basin separated from said source, and adjustable sluices associated with each area and arranged so that, irrespective of the tide direction, the sluices can be adjusted to cause water to flow only in said uni-direction through the turbine.

Thus, with the turbine designed for uni-directional flow rather than bi-direction flow as proposed up to the present for schemes using both ebb and flow generation, its efficiency can be optimised and a larger proportion of its available power can be captured.

Preferably, said enclosed space is provided by a walled enclosure which includes a part of the length of a barrage wall extending across the water source said enclosure being divided into said first and second areas by the wall in which the turbine is mounted, one end of which extends to said part length of the barrage wall.

In a preferred arrangement, the walled enclosure is rectangular in plan to provide two side walls perpendicular to the barrage wall and a rear wall extending parallel with said barrage wall, and the wall in which the turbine is mounted extends from said part length of the barrage wall to said rear wall and divides the enclosure into said first and second areas.

Preferably, two sluices are provided in said part length of the barrage wall, each being adjustable to open and close respective first and second areas of the enclosure with said water source, and two further sluices are provided, either in said rear wall, or respective said side walls, which are adjustable to open or close respective first and second areas with respect to said basin.

According to a feature of this invention, particularly in the case where the basin contained by the barrage wall is defined by a length of coastline, as discussed in our said co-pending application, the wall containing the turbine is effectively extended to divide the basic into two sub-basins.

In this way, water can be made to flow uni-directional through the turbine on the ebb tide from first one sub-basin and then on the flow tide to the other sub-basin by appropriate adjustment of their respective sluices and thereby prolong the period of usage of the turbine.

It will be appreciated that, instead of only one turbine being mounted in the wall separating said first and second areas, any number of turbines can be spaced along the wall depending upon the level of power to be generated.

In order that the invention may be readily understood, two embodiments thereof will now be described, with reference to the accompanying drawings in which.

Figure 1:
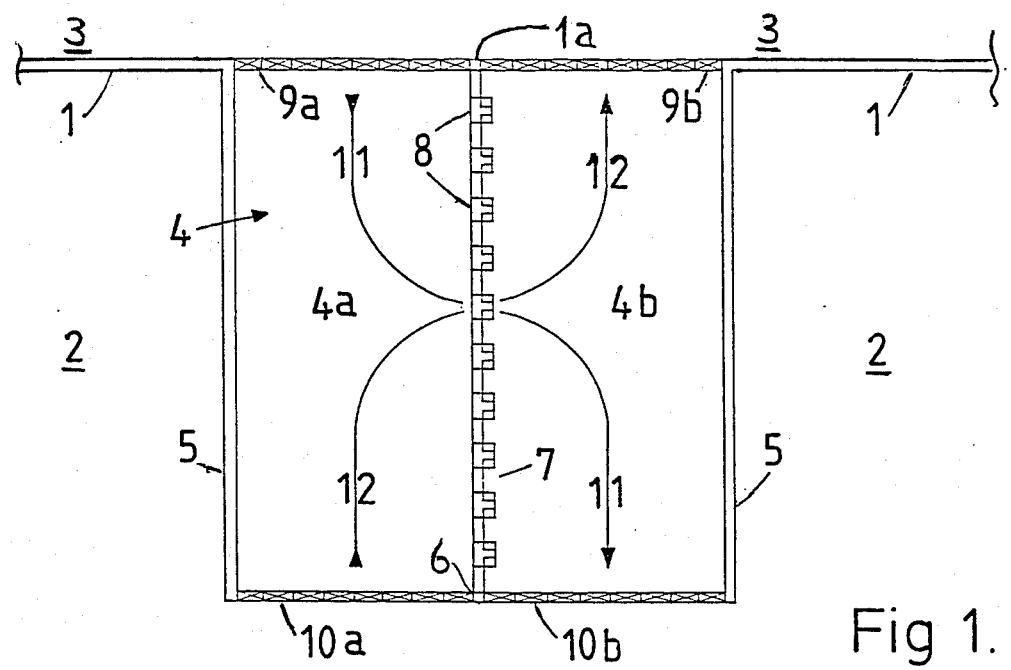
FIG. 1 is a diagrammatic plan view of the first embodiment.

Referring to FIG. 1, the first embodiment is for a shallow water application where an appropriate length of coastline is impounded by a main barrage wall 1 to provide a basin 2 closed-off from the open sea 3.

On the basin side of the barrage wall 1, a walled rectangular enclosure 4 is formed by a part length 1a of the barrage wall 1 two side walls 5 extending perpendicular to the barrage wall 1 on the basin side, and a rear wall 6 extending parallel to said barrage wall. The enclosure 4 is divided into first and second areas 4a and 4b by a further wall 7 which extends centrally from the barrage wall part 1a to the rear wall 6. The wall 7, as shown, has a line of spaced water turbines 8 mounted therein; these turbines are designed to be uni-directional for power generation.

The part 1a of the barrage wall 1 is provided with adjustable sluices 9a, 9b whereby the areas 4a, 4b respectively can be opened, or closed, to the open sea, whilst the rear wall 6 has adjustable sluices 10a, 10b whereby said areas 4a and 4b respectively can be opened, or closed, to the basin 2.

In operation, assuming that the unidirectional flows through the turbines 8 is from area 4a to area 4b, then during a flow tide from the open sea 3 sluices 9a and 10b are opened and sluices 9b and 10a a are closed so that the water flows through each turbine and in the direction of lines 11 indicated with single headed arrows. During an ebb tide, the sluices 10a and 9b are opened and the sluices 10b and 9a are closed so that the water flows through each turbine in the direction of lines 12 indicated with the double headed arrows.

At the end of one power generating phase, all of the sluices are opened to permit the basin level to adjust to the level of the sea, in preparation for the next power generation phase.

Figure 2:
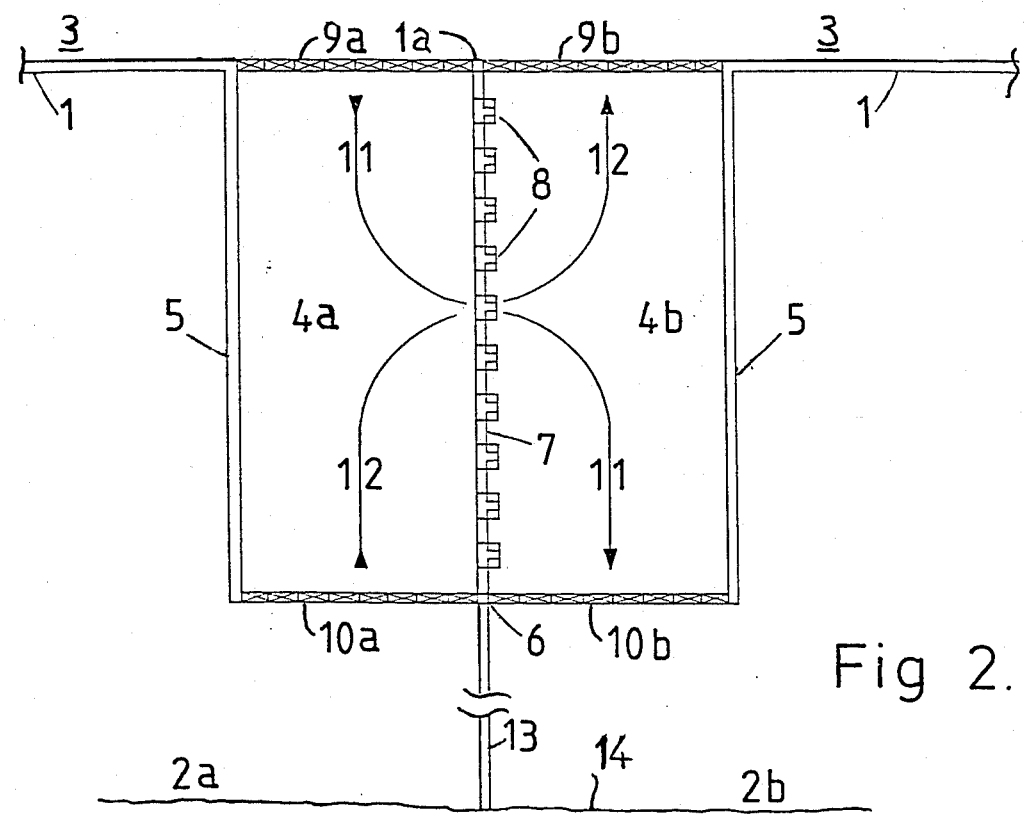
FIG. 2 is a view similar to FIG. 1 of the second embodiment.

Referring now to FIG. 2, this embodiment is similar to that of FIG. 1, but provides a divided basin scheme in which generation is by either ebb or flow tide rather than both ebb and flow tide. The basin 2 is divided by a wall 13 extending from the rear wall 6 between the sluices 10a and 10b to the coastline 14 so as to divide the basin into two sub-basins 2a and 2b.

In operation of this embodiment, basin 2a is emptied on the ebb tide through the turbines in the direction of the arrow 12, and the basin 2b is filled on the flowtide through the same turbines in the direction of the arrow 11, by appropriate use of the sluices. Hence, the use of the turbines is extended over a much longer period than is required to provide for one-way generation from the undivided basin of the first embodiment. Also, with this second embodiment, there are the advantages that the number of turbines required to service such a divided basin is much reduced compared with the number required for an undivided basin, and the power output is spread more evenly.

Figure 3:
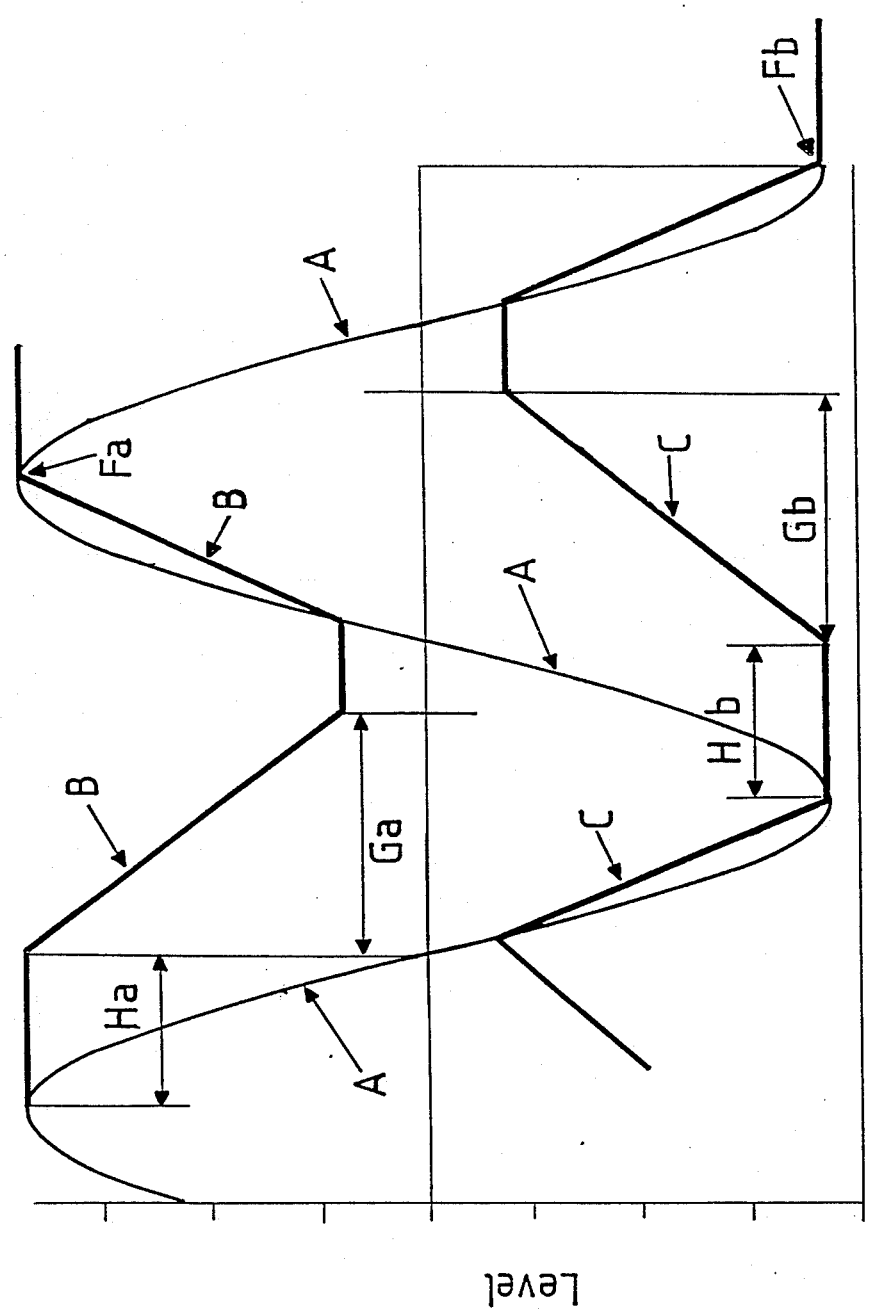
FIG. 3 is a graph showing water level plotted against time for the second embodiment.

The operation of this second embodiment is explained in further detail by reference to the graph of FIG. 3 where a line 'A' represents sea level, line 'B' the level on basin 2a, and line 'C' the level on basin 2b, all with respect to time.

Basin 2a is held at high tide level over the period Ha, and is then allowed to empty through the turbines producing energy for the period Ga. Its level is then allowed to fill with the flow tide to point Fa, by use of sluices not associated with the turbine enclosure, from which the cycle is repeated.

The basin 2b is held at low tide level over the period Hb, and is then allowed to fill through the same turbines, producing energy for the period Gb. Its level is then allowed to drop with the ebb tide to point Fb by use of sluices not associated with the turbine enclosure, from which point the cycle is repeated. Thus, since double use is made of the turbines, the number of turbines for a particular installation can be reduced.

We claim:

1. An arrangement for locating at least one water turbine in the path of a tidal water source for both ebb and flow power generation, characterised in that a turbine is used which is designed for uni-directional flow, in that the or each said turbine is mounted in a wall which divides an enclosed space into a first area which can be brought into communication with the tidal water source and a second area which can be brought into communication with a basin separated from said source, and in that adjustable sluices are associated with each area and arranged so that, irrespective of the tide direction, the sluices can be adjusted to cause water to flow only in said uni-direction through the turbine.

2. An arrangement according to claim 1, characterised in that said enclosed space is provided by a walled enclosure which includes a part of the length of a barrage wall extending across the water source said enclosure being divided into said first and second areas by the wall in which the turbine is mounted, one end of which extends to said part length of the barrage wall.

3. An arrangement, according to claim 2, characterised in that the walled enclosure is rectangular in plan to provide two side walls perpendicular to the barrage wall and a rear wall extending parallel with said barrage wall, and the wall in which the turbine is mounted extends from said part length of the barrage wall to said rear wall and divides the enclosure into said first and second areas.

4. An arrangement according to claim 3, characterised in that two sluices are provided in said part length of the barrage wall, each being adjustable to open and close respective first and second areas of the enclosure with said water source, and two further sluices are provided, either in said rear wall, or respective said side walls, which are adjustable to open or close respective first and second areas with respect to said basin.

5. An arrangement according to claim 1, in which the basin is defined by a barrage wall and a length of coastline, characterised in that the wall containing the turbine is effectively extended to divide the basin into two sub-basins, whereby water can be made to flow uni-directional through the turbine on the ebb tide from first one sub-basin and then on the flow tide to the other sub-basin by appropriate adjustment of respective sluices and thereby prolong the period of usage of the turbine.

* * * * *